July 13, 1965  H. DRENKELFORT  3,195,103
ECHO-SOUNDING SYSTEM

Filed Aug. 2, 1962

United States Patent Office 3,195,103
Patented July 13, 1965

3,195,103
ECHO-SOUNDING SYSTEM
Hans Drenkelfort, Kiel-Elmschenhagen, Germany, assignor to Electroacustic Gesellschaft mit beschränkter Haftung, Kiel, Germany, a German corporation
Filed Aug. 2, 1962, Ser. No. 214,426
Claims priority, application Germany, Nov. 25, 1960, E 20,237
10 Claims. (Cl. 340—3)

This is a continuation-in-part of my application Serial No. 155,253, filed November 24, 1961.

My invention relates to echo-sounding systems operating on the pulse principle.

There are known echo-sounding devices of this type in which the depth or distance measurement is effected by opening a gate stage in an electric circuit at the moment when the sounding pulse is being transmitted, and closing the gate stage at the arrival of an echo pulse whose amplitude exceeds a predetermined, preferably adjustable, value, for example an echo pulse reflected from the sea bottom. During the open interval of the gate stage, mutually equidistant pulses from a quartz-stabilized oscillator pass through the gate to an electronic counter calibrated in units of distance which directly indicates the distance measured and which, upon an adjustable period of time is zeroed by hand or automatically, whereafter a new measuring cycle can take place. Such equipment affords retaining the measuring results in readily readable condition for any desired length of time, but has the disadvantage that strong reflectors above sea bottom, for example schools of fish, may prematurely terminate the measuring operation and thereby simulate a wrong depth without it being possible aboard ship to decide whether the distance down to the bottom or only to a reflector above bottom is being measured. For avoiding faulty measurements, therefore, the receiving amplifier can be blocked for an adjustable fixed length of time so as to be released for operation only shortly prior to arrival of the bottom echo. This can be done only if the approximate depth of the sea bottom is known in advance and has the considerable disadvantage that when the depth suddenly decreases, the electronic counter will run through without effecting a depth measurement. Just then, however, a proper depth sounding is important because the ship may be in danger.

It is an object of my invention to eliminate the above-mentioned deficiencies of the known pulse-operated echo-sounding systems.

To this end, and in accordance with my invention, I combine in such a sounding system a digital-indication pulse counter with a simultaneously operating recording instrument, and I further provide pulse-controlled circuit means which control the recording instrument in such a manner that the position and magnitude of the distance range measured by the digital pulse counter is additionally marked into the echogram produced in the recording instrument.

According to another, more specific feature of my invention, I derive pulses by suitable coupling means from behind a few counting stages of the digital counter and supply these pulses to the stylus or other mark-producing member of the recording instrument whereby a scale or family of reference indicia is marked on the recording tape for the duration measured by the pulse counter. This affords determining at a glance onto the echogram recorded by the recording instrument, which particular distance has been measured by the pulse counter. For example, if the sea bottom is to be sounded, then the echogram must exhibit additionally entered marking lines between zero sound and the record of the bottom echo. If these lnes are interrupted at any location, this is indicative of the fact that the counter was stopped too early, for example by a school of fish or by a purely electrical disturbance. If the reference marker lines continue below the bottom echo, then the counter was not properly stopped by the bottom echo, because the threshold value of the gate circuit in the digital measuring counter was adjusted too high or was not automatically adjusted in time to the correct value.

In order to prevent a release of the gate circuit by echoes arriving ahead of the bottom echo, the threshold value can be set in known manner for an adjustable time to such a high amount that a release is no longer possible. The same result, however, is also secured if a blocking member is arranged ahead of the gate circuit and does not permit any echo pulses to pass through for an adjustable interval of time, for example by operation of a monostable multivibrator which blocks the passage of echo pulses during its adjustable dwelling time in the instable condition. When the multivibrator triggers back to its stable condition, then according to another feature of the invention, the pulse is preferably applied to the writing or stylus member of the recording instrument which then produces in the echogram an indication on the basis of which the extent of the blocking range can be adjusted at any time to an optimum, preferably by hand.

The entering of reference lines into the echogram produced in the recording instrument, these lines being produced electronically during the measuring period of the pulse counter, has the further advantage that the measured distances can be read out at very great accuracy and at any time, because any fluctuations in advancing speed of the recording member or stylus are eliminated. If for producing the counting pulses the above-mentioned quartz-controlled oscillator is substituted by an oscillator whose frequency can be adapted by hand or automatically to the particular velocity of sonic propagation in water, depending essentially upon the temperature, the salt content and the density of the water, then a very accurate measurement and indication by the digital indicating device as well as the recording instrument is afforded.

When the recording of the bottom-echo pulses in the echogram extends closely below the line of the electronically entered reference scale, it may happen that fine details of the bottom profile are no longer recognizable. For eliminating this deficiency, and in accordance with a further feature of my invention, the bottom-echo pulse or the stop pulse of the digital counter device is caused to trigger another monostable multivibrator to its instable condition, in which it remains for an adjustable interval of time. When the multivibrator switches back to stable condition, a short pulse is supplied to the stylus of the recording instrument which produces a marking below the recording of the bottom echo. As a result, there is produced a narrow, deeply black line parallel to the bottom-echo recording, whose course corresponds to the bottom profile. The spacing of this additional line from the beginning of the bottom-echo pulse is preferably so chosen that it corresponds to the mounting depth of the sonic transducer on the ship. In this manner, an indication of the depth below the ship bottom as well as the chart depth are obtained simultaneously. If the bottom-echo recording were longer than a value corresponding to the dwell time of the multivibrator for bottom-profile indication in instable condition, then the black profile line would not be distinguishable from the bottom echo. In order to then secure an indication of the bottom profile as well as of the chart depth, a negative pulse, produced when this multivibrator triggers back to stable condition, is supplied to the control grid of a tube, for example the end tube of the receiving amplifier, which is thereby blocked for a short interval of time. As a result, a narrow white line appears within the dark recording area of the bottom echo, and this white line extends at the adjusted distance from the beginning of the bottom-echo recording and follows a course corresponding to the bottom profile.

The invention will be further described with reference to the drawings in which.

Figure 1:
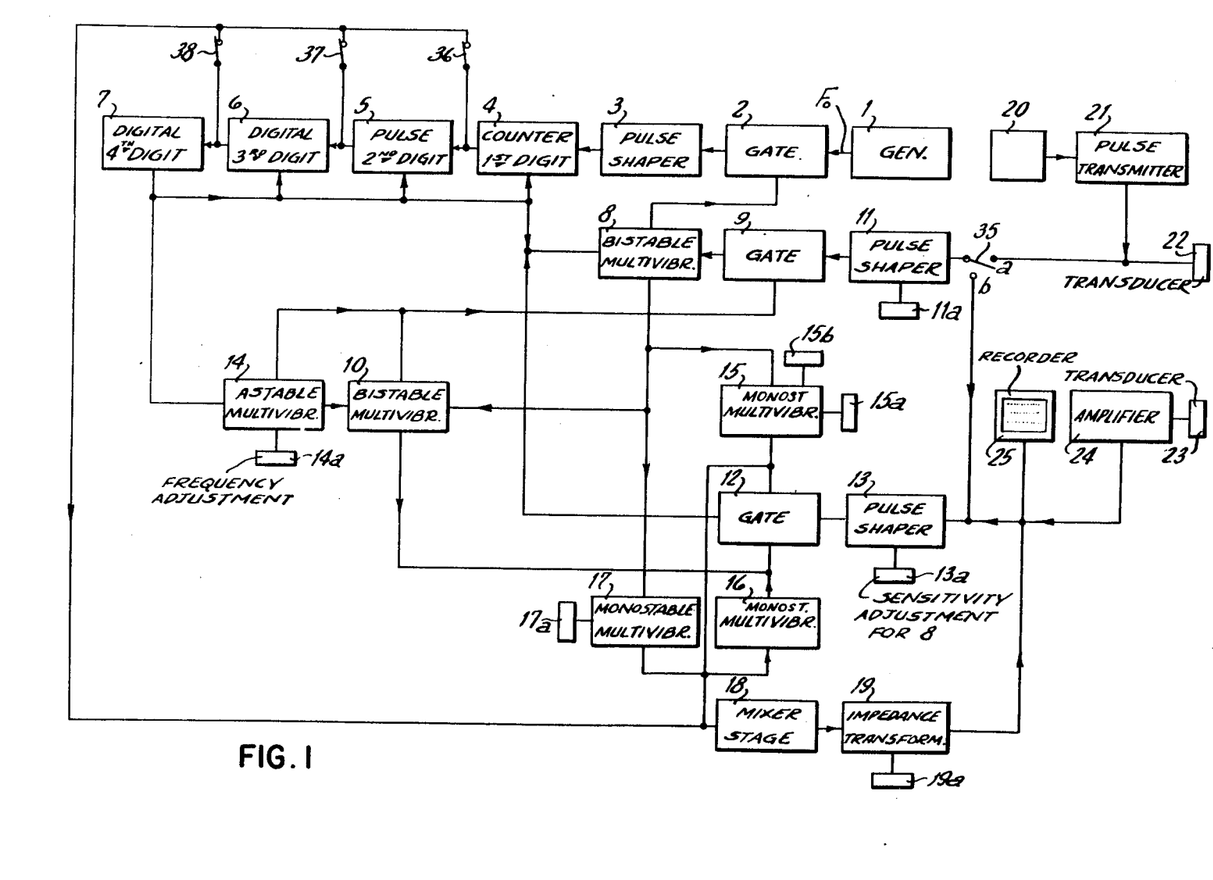
FIG. 1 is a block diagram of an echo-sounding system according to the invention, composed of several separate structural units.

The system shown in FIG. 1 comprises an electric pulse generator 1, for example a quartz-stabilized oscillator, which furnishes an alternating voltage of the frequency $f_0$, for example 10,000 c.p.s. This voltage is impressed upon a gate stage 2 and can pass through only when this stage is in open condition. In a following pulse-shaping stage 3, the alternating voltage signals are converted to suitable pulses and then pass into a pulse counter which comprises four counting decades 4, 5, 6 and 7 of a digital indicator.

Figure 2:
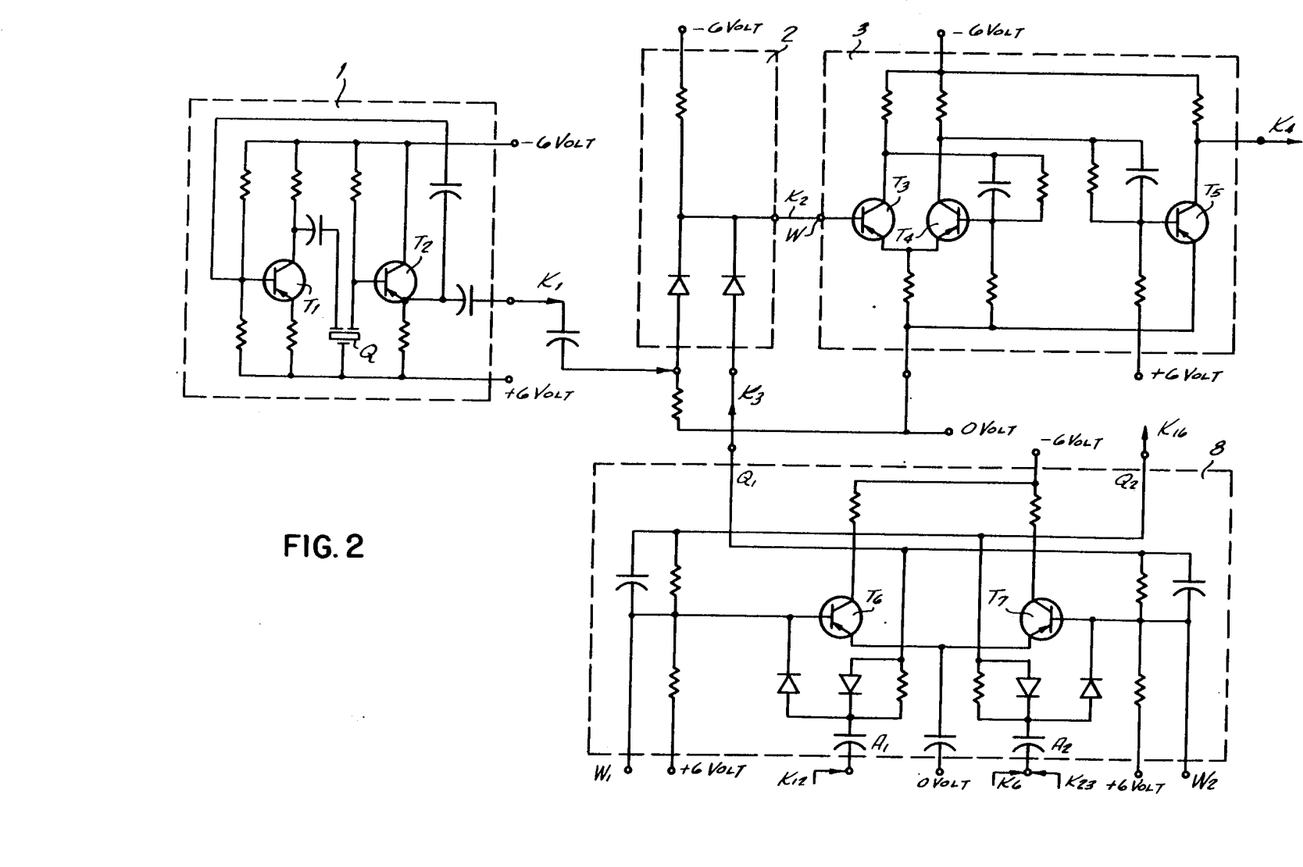
FIG. 2 is a circuit diagram of the components designated 1, 2, 3 and 8 in FIG. 1.

According to FIG. 2, the quartz-stabilized generator 1 consists of a transistor $T_1$ forming a part of a corresponding oscillator circuit possessing an oscillating quartz crystal Q. The output of the generator 1 is connected with the gate stage 2 by means of an impedance-matching emitter-follower stage comprising the transistor $T_2$. The signals of the crystal-stabilized generator 1 pass through the impedance-matching stage and through the line $K_1$ of the gate stage 2 when gate stage 2 is open. The alternating current signals are transformed into suitable pulses in a pulse shaper 3 with Schmitt-trigger-connected transistors $T_3$, $T_4$ and $T_5$ operating as follows:

In the rest condition of the pulse shaper 3, transistors $T_3$ and $T_5$ are turned on (open) and $T_4$ is blocked or turned off due to voltages appearing across the transistors $T_3$ to $T_5$. If a positive voltage pulse is applied via a pair of lines $K_1$ or $K_3$ and via the one or the other diodes of the gate stage 2, then transistors $T_3$ and $T_5$ are turned off and transistor $T_4$ is turned on. This causes the voltage on the collector of the transistor $T_5$ to jump from 0 volt to $-6$ volts. The pulse transformer or Schmitt trigger is characterized by a slow change of the input voltage in the neighborhood of a discrete threshold value causing the output voltage on the transistor $T_5$ to jump spontaneously from one state to another state, corresponding for example to a jump from $-6$ volts to 0 volt, and produce a positive pulse. From a sinoidally varying input voltage appearing at the line $K_1$ at the quartz-stabilized oscillator 1, the pulse shaper 3 produces pulses with steep ascending and descending slopes. These pass through a line $K_4$ to the pulse counter composed of counting decades 4 to 7. The sinoidal signals of the oscillator 1 can produce a pulse at the collector of the transistor $T_5$ only when the second diode of the gate stage 2, which is connected through the line $K_3$ with the bistable multivibrator 8 (FIG. 2), is biased in the reverse direction.

The base of the transistor $T_5$ in each case is set at 0 volt, and the output voltage at the collector of $T_5$ is negative. This affords the proper gate control by changing the output potential of the bistable multivibrator 8, which is connected through the line $K_3$ with the one diode of the gate stage 2.

Every time the output $Q_1$ of multivibrator stage 8 exhibits a negative potential, the pulse shaper 3 can change the sinoidal signals from the quartz-stabilized oscillator 1 into rectangular positive pulses and initiate the counting process. The stable multivibrator 8 is used in this embodiment in the conventional manner as a switch or commutator. A zero potential at a terminal $Q_1$ in multivibrator 8 biases the diode at line $K_3$ in the forward direction and closes the gate 2. Then the pulse transformer 3 furnishes no counting pulses through $K_4$.

Figure 3:
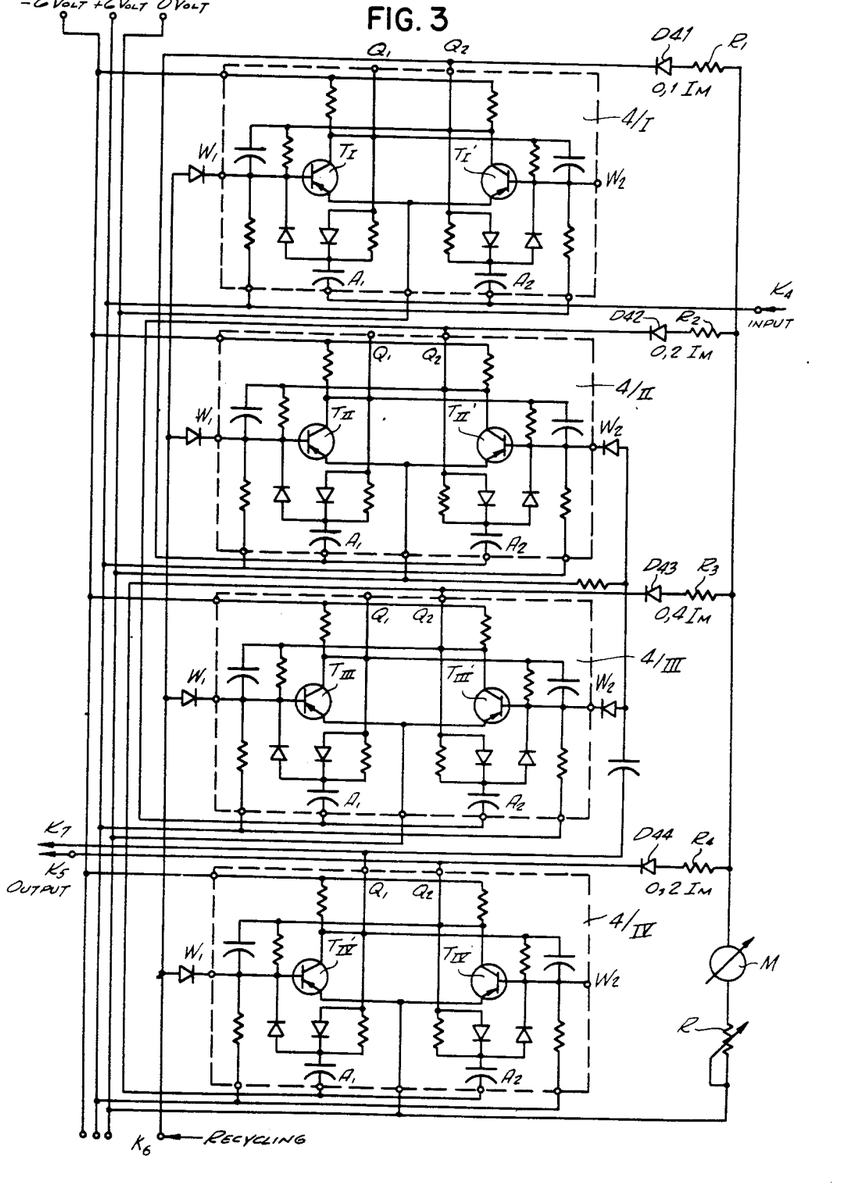
FIG. 3 is a circuit diagram of a counter decade and of the components 4/I, 4/II, 4/III and 4/IV.

The bistable multivibrator 8 is controlled from line $K_{12}$, leading to the gate 9 (see FIGS. 1, 2 and 3). If, with gate 2 open, the pulse transformer furnishes counting pulses through line $K_4$, then the first counting decade 4 is advanced with counting pulses. The first counting decade 4 is constructed from four digital modules, namely from bistable multivibrator stages 4/I, 4/II, 4/III and 4/IV (FIG. 3). Two pulse feedback paths $Q_1$ (4/IV) and $W_2$ (4/III) as well as $W_2$ (4/III) and $W_2$ (4/II) between the multivibrator stage 4/IV, 4/III and 4/II after the eighth counting pulse, serve to jump six out of sixteen possible binary figures, so that the counting decade possesses a counting capacity of ten figures. In the bistable multivibrator stages $Q_1$ constitutes the inverse or negative output and $Q_2$ the normal or positive output. $A_1$ and $A_2$ are the input terminals of the multivibrator stages. The first decade 4, after ten input pulses, furnishes a release pulse for the next decade 5 and simultaneously jumps back into the zero-position. At the eleventh pulse the decade again advances. In a similar manner the other decades 5 and 6, after 100 and 1,000 pulses respectively, produce release pulses for the following decades. When the entire pulse counter is filled, in this example with 9,999, all decades 4 to 7 jump back to the original value of zero at the 10,000th pulse.

Figure 4:
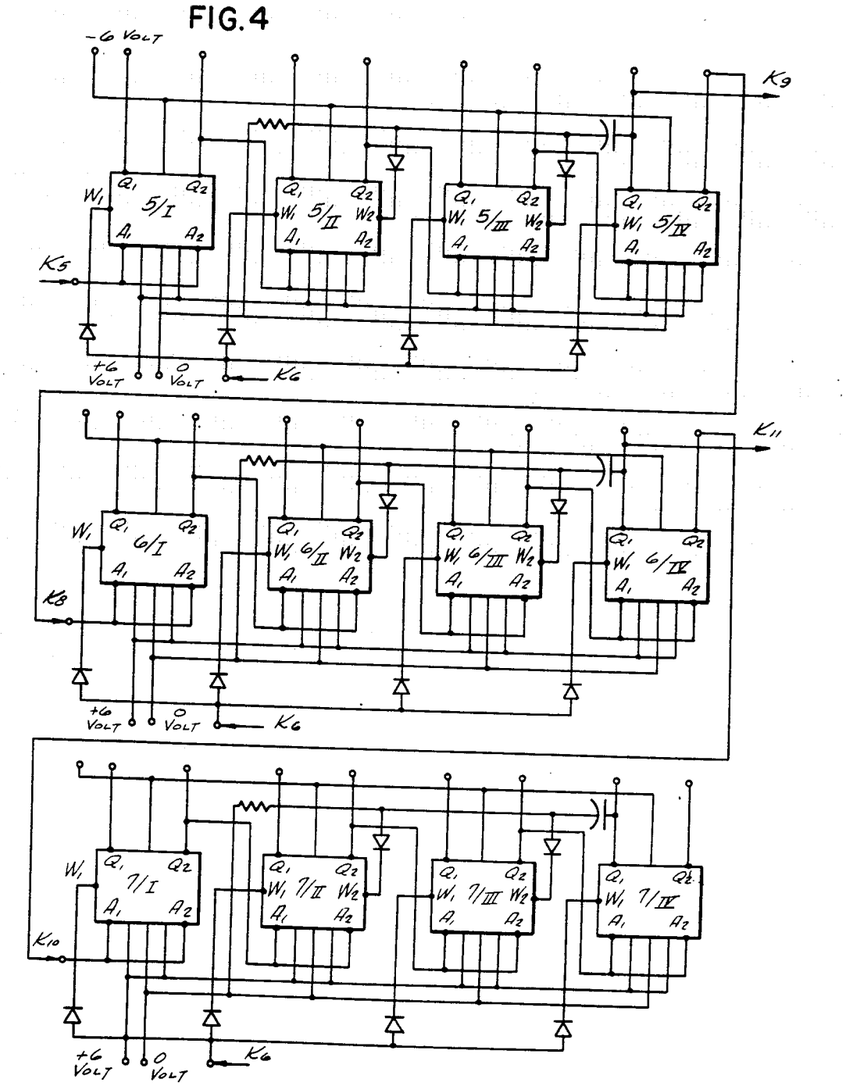
FIG. 4 is a block diagram of further counter decades.

With reference to FIGS. 3 and 4 the manner of operation of the multivibrator stages 4/I, 4/II, 4/III and 4/IV of the counting decade 4 is as follows. In the rest position of the counting decade 4, the transistors $T_I$, $T_{II}$, $T_{III}$ and $T_{IV}$ of the bistable multivibrator stages 4/I, 4/II, 4/III and 4/IV are in blocked condition, while the transistors $T_I'$, $T_{II}'$, $T_{III}'$ and $T_{IV}'$ of these bistable multivibrator stages conduct. The voltage at the terminals $Q_2$ at the collector of the transistors $T_I$ to $T_{IV}$ of these bistable multivibrator stages is positive. A positive incoming pulse arriving through the line $K_4$ from the pulse shaper 3, through the input $A_2$ of the bistable multivibrator stage 4/I, blocks the transistor $T_I'$, while rendering the transistor $T_I$ conductive. Thereby the voltage at point $Q_2$ jumps from $+6$ volts to $-6$ volts. This negative voltage change then passes to the inputs $A_1$ and $A_2$ of the bistable multivibrator stage 4/II. However, the blocking diodes at the inputs $A_1$ and $A_2$ render these negative pulses ineffective. Thus the bistable multivibrator 4/I, but not the bistable multivibrator 4/II, is reversed by the first pulse through the line $K_4$. A second pulse now arriving through line $K_4$ to the bistable multivibrator 4/I, through inputs $A_1$, $A_2$, blocks the transistor $T_I$ and opens the transistor $T_I'$. Thereby the voltage at points $Q_2$ of the collector of the transistor $T_I'$ jumps from $-6$ volts to 0 volt. The thus generated positive pulse passes through inputs $A_1$, $A_2$ of the bistable multivibrator 4/II and blocks the transistor $T_{II}'$. The voltage of the point $Q_2$, the collector of $T_{II}'$, now drops from 0 to $-6$ volts. The thus generated negative pulse passes to the inputs of the bistable multivibrator 4/III which, however, is not disturbed from its rest position.

A third pulse from the pulse shaper 3 through the line $K_4$, through input $A_2$, blocks the transistor $T_I'$ of the bistable multivibrator 4/I. The voltage at point $Q_2$ of multivibrator 4/I now drops from 0 volt to −6 volts. The negative pulse thus formed does not change the condition of the bistable multivibrator 4/II.

A fourth pulse through the line $K_4$ and inputs $A_1$, $A_2$ blocks transistor $T_I$ of the bistable multivibrator 4/I and opens the transistor $T_1'$. The voltage at $Q_2$ again jumps from −6 volts to 0 volt, the thus released positive pulse arriving through the input $A_1$ of the bistable multivibrator 4/II and blocking the transistor $T_{II}$, while turning on the transistor $T_{II}'$. The voltage at point $Q_2$ of the bistable multivibrator 4/II then jumps from −6 volts to 0 volt. The thus generated positive pulse arrives to the two inputs $A_1$, $A_2$ of the bistable multivibrator 4/III opening transistor $T_{III}$ and blocking the transistor $T_{III}'$. The voltage at point $Q_2$ of the bistable multivibrator thereby shifts from 0 volt to −6 volts. The thus generated negative pulse passes to the inputs $A_1$, $A_2$ of the bistable multivibrator 4/IV and does not shift this multivibrator.

With each subsequent counting pulse, the decade with the bistable multivibrators 4/I to 4/IV is switched further according to the above-described pattern. During the eighth counting pulse through line $K_4$ the multivibrator 4/IV flips over. Two feedback paths, namely through a condenser at point $Q_1$ of the bistable multivibrator 4/IV, to the two blocking diodes at the entrances $W_2$ of the bistable multivibrators 4/II and 4/III respectively, effect bypassing of six out of the sixteen possible counting positions. Thus the counting decade takes on again its original position at the tenth pulse. In this manner the "units" of decades are counted in the decade 4.

The decades 5, 6 and 7 having the same number of bistable multivibrator stages, also operate in the same manner. FIG. 4 illustrates the bistable multivibrator stage of the individual decades as small boxes with the respective connection designations $A_1$, $A_2$, $Q_1$, $Q_2$, $W_1$ and $W_2$. The circuits in the boxes are the same as illustrated in FIG. 3.

The decade 5 counts the "tens," when the decade 4 after counting the figure "10" passes a positive pulse to the decade, namely through the line $K_5$. The bistable multivibrators of the decade 5 are designated with 5/I, 5/II, 5/III and 5/IV.

The decade 6 counts the "hundreds," when the decade 5 after counting the figure "100," through the line $K_8$, passes the positive pulse to the decade 6. The bistable multivibrators of the decade 6 are designated as 6/I, 6/II, 6/III and 6/IV.

The decade 7 counts the "thousands," when the decade 6 after counting the figure "1000," through the line $K_{10}$, passes a positive pulse to the decade 7. The bistable multivibrators of the decade 7 are designated as 7/I, 7/II, 7/III and 7/IV. The output $Q_2$ is 7/IV is not used, since no higher order decade is used.

In FIG. 4 the operating voltages −6 volts, +6 volts and 0 volt, and a line $K_6$ lead to the decades 5, 6 and 7, exactly as in the decade 4 of FIG. 3. Through them, a positive pulse can switch the decades 4 to 6 to their original positions. The line $K_6$ connects, through blocking diodes, with the inputs $W_1$ of the bistable multivibrator stages of the decades 4, 5, 6 and 7.

The decades 4 to 6 also possess lines $K_7$, $K_9$ and $K_{11}$ (indicated in FIG. 1 by broken lines), through which the pulses pass through outlet terminals $Q_1$ for the control of lines, to be more fully described. The invention contemplates connecting these lines $K_7$, $K_9$, $K_{11}$ from the outlet terminals $Q_2$ (normal outlet). However, it is preferable to connect these lines to the inverse outlets $Q_1$ for sensing the linear pulses. Using negative inverse pulses avoids the otherwise necessary reversing stage in the pulse path, to be more fully described.

The given counting condition of the decades 4, 5, 6 and 7 is indicated upon a measuring instrument M having calibrations from 0 to 9 on its measuring scale. In the decade 4, for example, the position of the instrument indicator on the calibration 5 would mean that the counting instrument has counted 5 pulses. The determination of the counting condition with a measuring instrument and the circuit used for it are well known. The circuit is omitted in FIG. 4 in order not to complicate the drawing unnecessarily. However, it appears in FIG. 3 where the respective outputs $Q_2$ are connected with the measuring instrument M by means of diodes D41, D42, D43 and D44. Connected in series with the diodes are measuring resistors $R_1$ to $R_4$ having respective values such as to produce respective currents at the meter in the ratio of 0.1 to 0.2 to 0.4 to 0.2. Thus with all bistable multivibrators 4/I to 4/IV having negative outputs at the respective points $Q_2$ there results an output of a total of 9 units. Considered in terms of current where $I_M$ designates the total current reading capacity of the measuring instrument, the current output with all points at $Q_2$ at −6 volts equals $$0.1I_M + 0.2I_M + 0.4I_M + 0.2I_M = 0.9I_M$$

The smallest position of the measuring instrument is thus the indication of zero and the largest result $0.9I_M$ with eight intermediate positions. Thus altogether ten calibrations exist on the scale of the instrument, which corresponds to the figures 0 to 9. The measuring instrument M now shows a result which depends from the given position of the bistable multivibrators 4/I to 4/IV during the counting process. The calibrating variable resistor R serves for the adjustment of the measuring instrument M.

As stated with respect to FIGS. 1 and 3, the gate circuit 2 is controlled through the line $K_3$ by the bistable multivibrator 8. The latter either is controlled by the release pulse from the sound pulse transmitter 21, which responds to the sending generator 20, or is controlled by the echo pulse to be measured, which is received through the receiver transducer 23 and the receiver amplifier 24. The bistable multivibrator 8 is also controlled by gate circuits 9 and 12. The latter are connected respectively in the releasing channel and the receiving channel to the bistable multivibrator 8. A second similarly connected bistable multivibrator 10 controls gates 9 and 12 so that at any time only one of the two gates 9 or 12 is open. The sounding pulse generated by the sounding pulse transmitter 21 is passed into the sea water by means of the electroacoustic transducer 22. The echo pulses are received by another transducer 23. If desired, a single transducer may be used instead of the two transducers 22 and 23, in the known manner.

Figure 5:
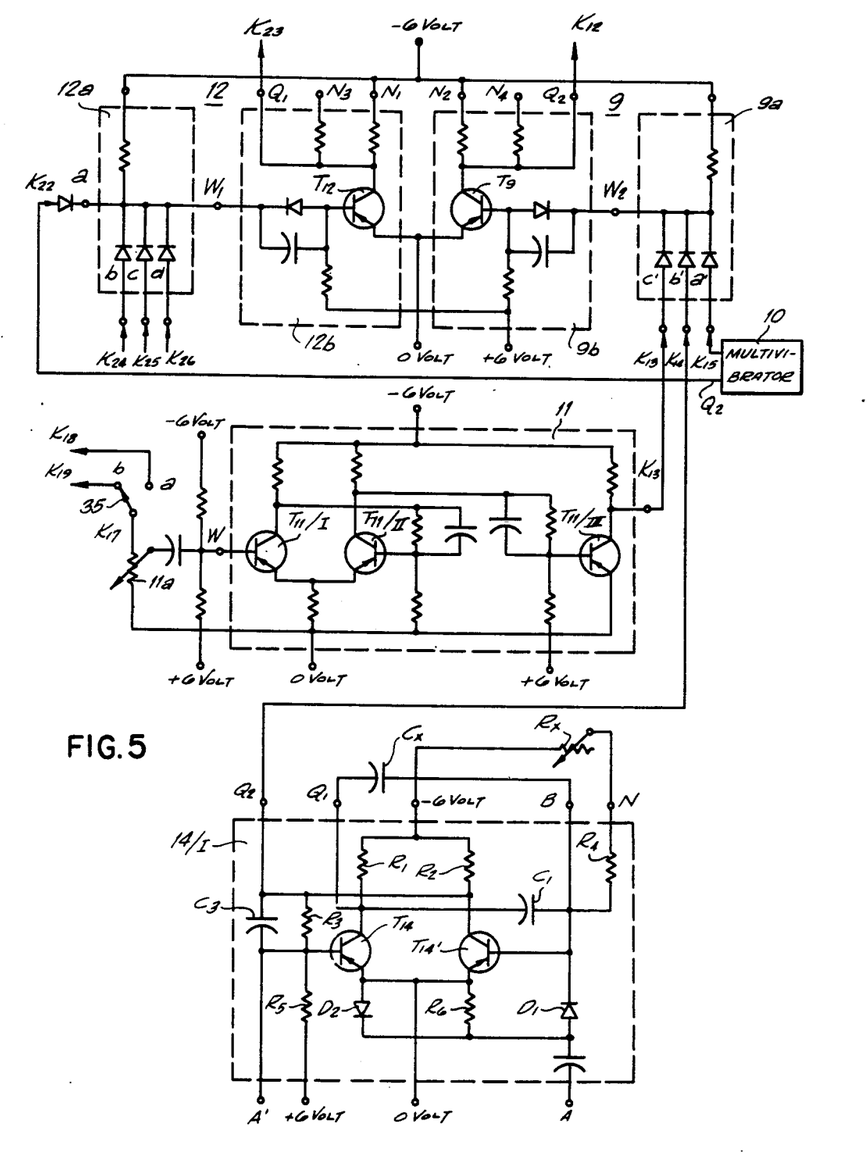
FIG. 5 is a circuit diagram of the components 9 and 12.

As seen from FIG. 5, the gate circuits 9 and 12 are constructed of components 9a, 9b and 12a, 12b. Component 9a is an AND-gate with 3 input diodes $a'$, $b'$, $c'$, and component 9b is one-half of a double-reversing stage. This reverse stage with the transistor $T_9$ is necessary to provide positive pulses for the control of the bistable multivibrator 8, from the negative pulse produced by the AND-gate. The input $W_2$ of the reversing stage 9b only exhibits a negative voltage pulse, when all 3 diodes $a'$, $b'$ and $c'$ are biased in the blocking direction, that is, when a negative pulse appears at the lines $K_{13}$, $K_{14}$ and $K_{15}$ which are connected to the respective diodes. A positive pulse or a zero-voltage maintained at any of the diodes $a'$, $b'$ or $c'$ by means of one of the lines $K_{13}$, $K_{14}$ or $K_{15}$, produces a positive pulse at the outlet $W_2$. This is so regardless of whether any other one of the diodes $a'$, $b'$ or $c'$ is biased in the blocking direction, that is with a negative pulse, or was just shifted from between the conducting and blocked conditions.

In FIG. 5 the line $K_{13}$ connects with the pulse shaper or Schmitt trigger 11 which corresponds with the same circuit in FIG. 2. This pulse shaper possesses a threshold value adjuster 11a in the form of a variable resistor. The lines $K_{14}$ and $K_{15}$ lead respectively to a stable multivibrator 14 and a bistable multivibrator 10. The latter corresponds in construction to the multivibrator components used in the counting decades 4 to 7

Only when both the components 10 and 14 provide negative output pulses, can a positive pulse appear on an input line $K_{12}$ of the bistable multivibrator 8 and control the latter so that its output $Q_1$ carries a negative pulse which opens the gate 2. The inverse output $Q_2$ then produces a positive pulse, which is employed for the control of the bistable multivibrator 10 through the line $K_{16}$.

The gate 12 consists of an AND-gate 12a and the other half 12b of a double-reversing stage 12b, 9b. This half of the double-reversing stage includes a transistor $T_{12}$ connected in the same way as the other half 9b. The AND-gate 12a requires a reversing stage 12b for the same reasons as those stated in connection with the gate 9, namely to provide positive output pulses at an output line $K_{23}$. The AND-gate 12a possesses four input diodes a, b, c and d which are connected together on their respective cathode sides and lead to an input $W_1$ of the reversing stage 12b. Connected to the diode is a line $K_{22}$, which connects with the output $Q_2$ of the bistable multivibrator 10. The diode b connects through a line $K_{24}$ to a monostable multivibrator 15, which has the same circuit as the monostable multivibrator 14/I (FIG. 5). The diode c is connected through the line $K_{25}$ with the monostable multivibrator 16, which has the same circuit as the monostable multivibrator 15. The diode d is connected through the line $K_{26}$ with the pulse shaper 13, which, as already mentioned, corresponds in its circuit to the pulse shaper 11 (FIG. 5).

If all diodes a to d were to receive from the lines $K_{22}$, $K_{24}$, $K_{25}$ and $K_{26}$ a voltage of $-6$ volts, then all these diodes would be biased in the blocking direction, so that a negative voltage of $-6$ volts would lie at the input $W_1$. If any of the diodes a to d were to receive a positive voltage or a voltage of 0 volt through the connecting line, then the voltage at the input $W_1$ of the reversing stage 12b would exhibit a positive value. A negative pulse would then be formed at the output $Q_1$ and arrive through the line $K_{23}$ at the connecting point $A_2$ of the bistable multivibrator 8. Thus to produce a positive signal at the output $Q_1$ of 12b and at the connecting point $A_2$ of the bistable multivibrator 8 it is essential that the lines to the diodes a, b, c and d all have a negative voltage. This prerequisite is fulfilled only when the monostable multivibrators 15, 16, the pulse shaper 13, and the bistable multivibrator 10 are all in condition to deliver negative pulses into the AND-gate 12a. When these conditions are fulfilled, the pulses arriving through the receiving channel, and therefore through the pulse shaper 13, can be further transmitted.

The sounding pulse issuing from the pulse transmitter 21 when passing to the transducer 22, is simultaneously passed through the line $K_{18}$ via a pulse-shaping stage 11 and the open gate 9 to the bistable multivibrator 8, and switches this multivibrator to the condition in which the gate 2 is open. At this moment $t_1$ the pulse counter commences to count pulses. The transducer 22 may be identical with transducer 23.

Simultaneously with the commencement of counting, the bistable multivibrator 10 is switched by the multivibrator 8 so that now gate 9 is closed and gate 12 opened. This prevents any electric disturbance coming from the sounding pulse transmitter 21 from prematurely repeating the counting operation.

When now a sufficiently strong echo signal is received by transducer 23 and amplified in the receiving amplifier 24, it arrives through a pulse-shaping stage 13 and the open gate 12 at the bistable multivibrator 8 and switches the latter multivibrator at the moment $t_2$ to its first stable condition, thereby closing the gate 2 of the pulse counter. Since the gate 9 remains closed, the gate 2 of the pulse counter cannot yet be opened by further transmitter pulses. Consequently, the measuring result indicated by the pulse counters 4 to 7 remains preserved. The duration of such memory of pulse-counter indication is determined by the trigger frequency of an astable multivibrator 14 (see FIGS. 5 and 6). By means of its actuating member 14a, the trigger frequency is continuously and/or incrementally adjustable. Upon lapse of the trigger period of the astable multivibrator 14, the bistable multivibrator 10 is reversely controlled so that now again the gate 9 of the releasing channel is opened and the gate 12 of the receiving channel is blocked. Simultaneously, the counting decades 4 to 7 of the pulse counter are automatically reset to zero, and the system is ready for another measuring operation.

Figures 5A, 6, 7:
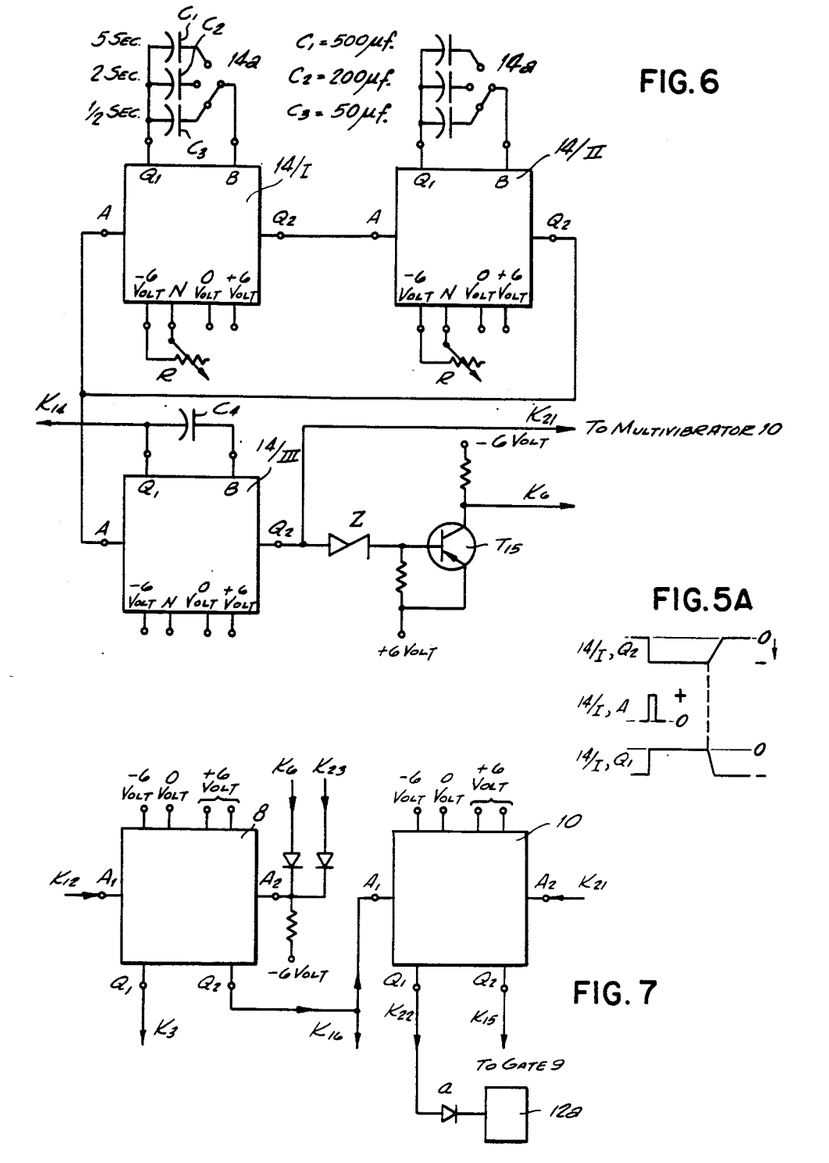
FIG. 5a is a group of graphs illustrating the operation of FIG. 5.
FIG. 6 is a circuit diagram of the multivibrator 14.
FIG. 7 is a circuit diagram showing the connections between members 8, 10 and 12 in FIG. 1.

The astable multivibrator is composed of three structural units 14/I, 14/II and 14/III (FIG. 6). One of these components 14/I is illustrated in FIG. 5 and constitutes a monostable multivibrator. This type of construction permits employing three conventional components and furnishes a pulse for resetting the counter decades 4 to 7. The monostable multivibrator (FIG. 5) consists of two transistors $T_{14}$ and $T_{14}'$. In rest position, the transistor $T_{14}'$ is conductive, the transistor $T_{14}$ is blocked, and the output $Q_2$ is negative. Now a positive pulse arriving through terminal A on 14/I by way of the diode $D_1$ at the base of transistor $T_{14}'$ blocks $T_{14}$ for a short period of time. The voltage on the collector of $T_{14}'$ then jumps from 0 volt to $-6$ volts. This jump in voltage is transferred to the base of transistor $T_{14}$ through a resistor-condenser-combination thereby rendering $T_{14}$ conductive. The collector voltage of $T_{14}$ also jumps from a negative voltage of $-6$ volts to 0 volt. This positive voltage jump now passes through the condenser $C_1$ as well as through the condenser $C_x$ which is connected between the terminals $Q_1$ and B, to the base of transistor $T_{14}'$. This positive voltage rise keeps the transistor $T_{14}'$ in blocked position, even after the positive pulse, which passed via terminal A to the base of $T_{14}'$, has since died away. The diode $D_1$ is biased in blocked direction so that the positive charge on the condensers $C_1$ and $C_x$ can flow off only through the resistances $R_4$ and $R_x$. With the reduction in the positive voltage of the condenser after a predetermined time the base of $T_{14}'$ becomes negative again thereby again rendering the transistor $T_{14}'$ conductive. Thus the voltage of the collector of $T_{14}'$ at the output $Q_2$ drops from the hitherto existing negative valve of $-6$ volts to a smaller negative valve. This reduction in the negative voltage of $-6$ volts is transferred by means of capacitor $C_3$ and resistor $R_3$ to the base of $T_{14}$ and reduces the conduction of transistor $T_{14}$ so that the hitherto zero voltage level on the collector of $T_{14}$ becomes slightly negative. This increase in negative voltage passes over the condensers $C_1$, $C_x$ to the base of transistor $T_{14}'$ and permits the condensers to discharge faster. The discharge effect proceeds spontaneously and in a short time the rest position of the vibrator wherein transistor $T_{14}'$ is conductive and transistor $T_{14}$ is blocked, again prevails.

FIG. 5a illustrates the waveform at the input A and the output terminals $Q_1$ and $Q_2$ of 14/I. In rest position the voltage at terminal $Q_2$ of circuit 14/I is positive. It becomes negative upon arrival at terminal A of a positive pulse and remains negative for a predetermined time period after which it returns rapidly but exponentially to its zero volt rest position. The voltage at the output of terminal $Q_1$ is opposite to that at $Q_2$. Thus the voltage goes from $-6$ volts back to 0 volt and returns after the same time period from 0 volt to $-6$ volts. However, this last drop proceeds at a steeper rate than at terminal $Q_2$.

With the aid of the variable resistor $R_x$ the duration of the monostable and (the reverse) metastable condition can be varied within very wide limits by changing the capacitance of the condenser $C_x$. Without the condenser $C_x$ the delay duration of the monostable multivibrator 14/I amounts to 5 micro-seconds. With an additional capacity of 100 nf. or 0.1 µf. it amounts to about one millisecond.

As shown in FIG. 6, two such monostable multivibrators are connected in a chain or in a ring, namely the multivibrators 14/I and 14/II, which are designated as small boxes with the same terminal designation as drawn in FIG. 5. FIG. 6 illustrates still a third multivibrator 14/III, whose manner of operation will be described subsequently. In multivibrator 14/III the condenser $C_x$ is replaced at 14/I and 14/II by three condensers $C_1$, $C_2$ and $C_3$, which can be connected one after another by a standard switch 14a to the terminals $Q_1$ and B. The condenser $C_3$ has a value of 50 μf. and adds a delay period of ½ second to each of the components 14/I and 14/II, and since the two components are connected in series, a total delay period of ½+½ second=1 second; the condenser $C_2$ has a capacitance of 200 μf. and produces a delay of 2+2=4 seconds and the condenser $C_1$ which is 500 μf. produces a delay of 5+5=10 seconds. The invention contemplates connecting a still smaller condenser than 50 μf., for example, 5 μf. for a delay of 0.1 second which would be necessary for a sonar range of 75 meters. By varying the resistances R of 10,000 ohms and by actuating only one of these resistors the delaying period can be finely adjusted.

The chain circuit or ring circuit of the components 14/I and 14/II operates as follows:

A positive pulse arriving at the input terminal A of 14/I, through its 50 μf. condenser $C_{101}$ effects a flipping action so that output $Q_2$ becomes negative. After about ½ second, the multivibrator switches back so that $Q_2$ changes from negative to positive. This occurs because the transistor $T_{14}'$ is first blocked by the input pulse and then after ½ second, is switched from the blocked state to the conductive state. A positive pulse thus originates ½ second after the input pulse and passes to point A in multivibrator 14/II switching the latter. After a further delay in the component 14/II, a positive pulse at its output $Q_2$ again passes to the input A of multivibrator 14/I. This ring connection effects continuous and automatic switching of the two monostable multivibrators 14/I and 14/II once they are triggered.

A third monostable multivibrator 14/III produces the pulse for recycling or starting over the counting decades through line $K_6$. The time constant of this multivibrator is considerably shorter than those of 14/I and 14/II, amounting to 20 microseconds with a condenser $C_4'$ of 2 nf. This monostable multivibrator 14/III is switched at the same moment as the multivibrator 14/I and produces a negative pulse flank (front side of the pulse) at the output $Q_2$, which flank passes through a Zener diode Z to a transistor $T_{15}$. Transistor 15 is blocked in rest position and now becomes conductive so that the collector voltage jumps from —6 volts to 0 volt. This positive voltage pulse passes through the line $K_6$ to the counting decades 4 to 7, for simultaneously recycling them, within 20 microseconds, into their starting position. After completion of the return to the original position, the output $Q_2$ of the monostable multivibrator 14/III switches from negative voltage to 0 voltage, thus forming a positive voltage pulse which by means of the line $K_{21}$ shifts the bistable multivibrator 10 (having the same circuit as the multivibrator 8). The switching frequency of the astable multivibrator 14 is thus rendered constant by the actuation member 14a which is continuously or incrementally adjustable and includes the resistor R. After termination of the switching period of the astable multivibrator 14, which—as described—consists of several components, the bistable multivibrator 10 is switched so that the gate 9 of the releasing channel is open and the gate 12 of the receiving channel is blocked. At the same time the counting decades 4 to 7 of the pulse counter are automatically recycled and the apparatus is ready for a new measurement.

If, for any reason, the counting operation is not stopped by an echo pulse, the pulse counter continues running without a releasing pulse when the system is again ready for measuring operation. In order to prevent this, the bistable multivibrator 8 is reversed by the multivibrator 14 through line $K_6$ (see FIG. 2) simultaneously with clearing the indication of the pulse counter at the moment $t_e$, so that the gate 2 is closed and hence the counting operation is interrupted not later than at the zeroing moment.

The cooperation of the two bistable multivibrators 8 and 10 is schematically illustrated in FIG. 7. The circuit of the bistable multivibrator 8 is indicated in FIG. 2, and the bistable multivibrator 10 has the same circuit. A positive pulse through the line $K_{12}$ to the input $A_1$ of the bistable multivibrator 8 renders the output $Q_1$ negative and the output $Q_2$ positive. A positive pulse at the output $Q_2$ is formed during the change from —6 volts to 0 volt and passes through the line $K_{18}$ to the input $A_1$ of the bistable multivibrator 10. This pulse shifts the multivibrator 10 in the same manner as the bistable multivibrator 8, so that at its output terminal $Q_1$ there arises a negative pulse and at the output terminal $Q_2$ a positive flank arises. This positive flank, which is formed because of the pump from —6 volts to 0 volt, passes through the line $K_{15}$ to close the gate 9 at the moment the counter starts to count. The output $Q_1$ of multivibrator 10 issues a negative pulse through the line $K_{22}$ and to the AND-gate 12a of the gate 12 (FIG. 5), which is now opened. It is also the function of the bistable multivibrator 10 to close and to open the two gate circuits 9 and 12 at the proper time. This alternating opening and closing of the two gates 9 and 12 provides for closing the incoming channel or the start channel by way of the pulse transformer 11 and the gate 9, so that an eventual second signal, also passing through the incoming channel, can again cancel stoppage of the incoming channel. The latter occurred in the intervening period because of the pulse transformer 13 and the gate 12.

The sensitivity of the multivibrator 8 for response to signals of the receiving channel can be adjusted by means of a control member 13a of the pulse-shaping stage 13. For example, when the pulse counter serves for measuring the distance from the sea bottom, the gate 12 is opened not immediately upon commencement of counting at the moment $t_1$, but rather at a later moment so that any disturbing signals, for example echoes of schools of fish, cannot interrupt the counting operation. Used for this purpose are two monostable multivibrators 15 and 16. The multivibrator 15 is released with the commencement of counting at the moment $t_1$ by resetting of the bistable multivibrator 8, and the multivibrator 16 is then released by the multivibrator 15. The three multivibrators 10, 15 and 16 jointly control the gate 12 in such a manner that it is open only when all three multivibrators are in a given condition. This is explained with the circuit diagram for the monostable multivibrator 14/I (FIG. 5).

The circuits for multivibrators 15 and 16 are the same as for the multivibrator 14/I. In rest position for example for the multivibrator 15, the right transistor is open and the left transistor is blocked. Thus the collector voltage on the right transistor is 0 volt and the collector voltage on the left transistor is negative, and the output terminal $Q_1$ of multivibrator 15 is negative. A positive pulse applied to the input A blocks the right transistor and turns on the left transistor. The collector voltage on the left transistor spontaneously jumps from —6 volts to zero volt. This voltage passes over the line $K_{24}$ to the diode b of the AND-gate 12a (FIG. 5). The voltage at the input terminal $W_1$ of the reversing stage 12b thus rises to 0 volt. Thus there is formed at the output $Q_1$ of 12b a negative pulse which does not contribute to switching the bistable multivibrator 8 through the line $K_{23}$. The signals arriving over the diode d through the line $K_{26}$ from the pulse transformer 13 would not now affect the voltage at $Q_1$. In no case can they make the voltage positive, because $W_1$ is at a value of zero volt. The gate 12 would be thus blocked for the echo signals passing for the pulse transformer 13.

The same also occurs, when a positive voltage from the multivibrator 16 through the line $K_{25}$ arrives at the diode $c$ of the AND-gate 12a. In this case also the echo signals cannot be transmitted over the pulse shaper 13.

Finally the bistable multivibrator 10 controls the AND-gate 12a through the diode $a$ and through the line $K_{22}$. This multivibrator 10, which alternately opens and closes the gate 9 and the gate 12, must be adjusted together with the multivibrators 15 and 16, so that a negative voltage exists at the diodes $a$, $b$ and $c$, thereby biasing them in the blocked direction. Then the negative pulses arriving from the pulse shaper 13 through the line $K_{26}$ can pass, since the gate 12 is now open. The regulating member mounted on the pulse shaper 13 corresponds to the regulating member 11a, which is shown in FIG. 5 for the pulse shaper 11. Instead of the lines $K_{17}$, $K_{18}$ and $K_{19}$, the line $K_{27}$ connects to the input W of the pulse shaper 13, and the line $K_{26}$ connects to the output Q.

The line $K_{27}$ leads to the receiving amplifier 24, which receives echo signals from the receiving transducer 23 and suitably amplifies them. The amplified sinusoidal signals arriving at the pulse shaper 13 through the adjustment member 13a are transformed in the pulse shaper 13 into rectangular ones. These rectangular signals of echo pulses can only shift the bistable multivibrator, when the multivibrators 10, 15 and 16 bias the AND-gate 12a negatively. During the switching of the bistable multivibrator 8 the counting process is stopped. The counting result remains stored until the astable multivibrator 14 returns the counters to the original position and the new measuring process is started.

With the two monostable multivibrators 15 and 16 it is now possible to select any desired period of time from the sounding period for counting measurement and line indication while blanking out the remainder. Thus very remote targets, which are received as relatively weak echo impulses, can be used for stopping the counters despite the existence of a great number of intervening and essentially stronger reflected echo pulses which occur during the preceding blanked-out time in the sounding period. For example, if the monostable multivibrators 15 and 16 were not available, each fish echo or each disturbing reflection could stop the counters thereby producing a false measurement for the sea bottom. The monostable multivibrator 15 is constructed identically with the monostable multivibrator 14/I (see FIG. 5). A positive pulse from the bistable multivibrator 8 arrives through line $K_{16}$ to the input A. Thereby the multivibrator 15 is shifted in the known manner.

The adjustment members 15a (corresponding to $C_x$) and 15b (corresponding to $R_x$) permit a gradual and/or constant regulation. The gradual regulation is possible by changing the capacitor 15a and the constant regulation by changing the variable resistor 15b. This multivibrator produces during return flipping or switching a positive pulse at its output $Q_2$ which passes through the line $K_{28}$ to the input A of the monostable multivibrator 16. This multivibrator possesses a fixed, that is non-varying, condenser $C_x$ and a fixed resistor $R_x$ and is switched from its rest position by a positive pulse at its input A. It switches back after a time determined by capacitor $C_x$ and resistor $R_x$, usually of 1 millisecond. Both the multivibrators 15 and 16 control the previously described gate 12, except that during the delay period both multivibrators 15 and 16 close the gate 12 and no echo signal can arrive here through the line $K_{26}$. This affords the possibility of blocking the stopping channel for an exactly adjustable period of time by adjustment of 15a and 15b.

The multivibrator 15, whose time constant is continuously and/or incrementally adjustable by means of the actuating member 15a and 15b, is switched to instable condition when the gate 2 opens, and, upon lapse of the time $\Delta t_1$, when the multivibrator 15 triggers back into the stable condition, releases the second multivibrator 16 which then switches to its stable condition after a period $\Delta t_2 \approx 1$. Beginning at this moment, i.e., $$t_1 + \Delta t_1 + \Delta t_2,$$

the gate 12 is opened and the counting operation can be stopped by a suitably strong echo signal.

The pulses required for switching the next following decades are coupled out of the output leads of counting decades 4, 5 and 6 of the pulse counter. These pulses are supplied to the indicating or stylus member of the recording instrument, in addition to the echo pulses, through a mixer stage 18 and an impedance transformer 19 which is adjustable by a control member 19a. These coupled-out counting pulses produce on the record carrier a scale of indicia which, during continuous operation, constitutes a group of lines. These lines appear only in the range which is being measured by the pulse counter, for example between zero sound and bottom-echo indication. When the counter is stopped by the echo coming from a reflector between sea bottom and surface, the lines become interrupted at this location, and the observer recognizes immediately that the measuring results indicated by the pulse counter are incorrect. If the receiving channel is so insensitively adjusted that the counting operation is not terminated by the sea-bottom echo, then the lines continue below the bottom-echo indication.

Since the marking pulses coupled out of the outlet leads at the counting decades act additively, each one-hundredth line is written more heavily than each tenth and each tenth line appears thicker than the other. For this reason, there can be selectively entered by continuously adjusting the control member 19a, a distance marker on the echogram at each tenth, hundredth, or thousandth counting pulse. Then, by increasing attenuation in the pulse transformer, first all marking pulses will reach the marking stylus of the recording instrument, thereafter only the stronger tenth and hundredth pulses, and ultimately only each hundredth pulse. The same effect can be obtained when the switch 36 or the switches 36 and 37 are opened. By opening all switches 36, 37, 38, the electronic marking of lines can be entirely switched off. If only the switch 37 is open, only each hundredth line is written more heavily. If only switch 38 is open, only each tenth line is written heavily. If switches 37 and 38 are open, no line is heavier than the others. This, of course, presupposes that the control member 19a is so adjusted that all marking pulses reach the recording stylus.

To afford optimal adjustment in blocking of the receiving channel always, a pulse occurring when the multivibrator 15 is reset to the stable condition, is supplied through the mixing stage 18 and the impedance transformer 19 to the indicating or stylus member of the recording instrument 25. The termination of blocking of the receiving channel is thereby identified in the echogram as a sharp line and can be adjusted by means of the control members 15a and 15b so that the sharp line always extends closely above the bottom-echo recording. To prevent the pulse counter from being stopped by this identifying pulse, the opening of the gate 12 by the multivibrator 16 takes place with a time delay of $\Delta_{t2}$.

If the sea bottom is nearly horizontal, it may happen that due to the electronic lining of the recording surface, fine details of the bottom profile are no longer recognizable. To avoid this, the illustrated system is provided with another monostable multivibrator 17 whose time constant is adjustable by a control member 17a and which, each time during switching of the multivibrator 8, is triggered to instable condition by an echo pulse of suitable intensity, for example the bottom-echo pulse. When the multivibrator 17 switches back to stable condition, it furnishes a pulse through the mixing stage 18 and the impedance transformer 19 to the stylus member of the recording instrument 25 which produces in the echogram beneath the bottom-echo recording a sharp line whose course corresponds to that of the sea bottom. The time constant of the multivibrator 17 is preferably so adjusted that the distance of the profile line from the bottom-echo recording corresponds to the distance of the electroacoustic transducer of the sounding equipment from the water surface. In this case, the echogram furnishes at any time an indication of the depth below the vessel as well as the chart depth. With an insufficient bunching in the directional characteristic of the transmitting transducer 22 and the receiving transducer 23, the recording of the bottom echo, particularly at relatively great depth, is so long that this line may become lost within the black or dark portion of the recorded echo. In this case, a negative pulse produced by the monostable multivibrator 17, when triggering to its stable condition, is supplied to the control grid of an amplifier tube, for example the end tube of the receiving amplifier 24. As a result, the receiving amplifier is blocked for a short interval of time, and in lieu of a black line, a light profile line appears within the black echo area on the record surface.

Figure 8:
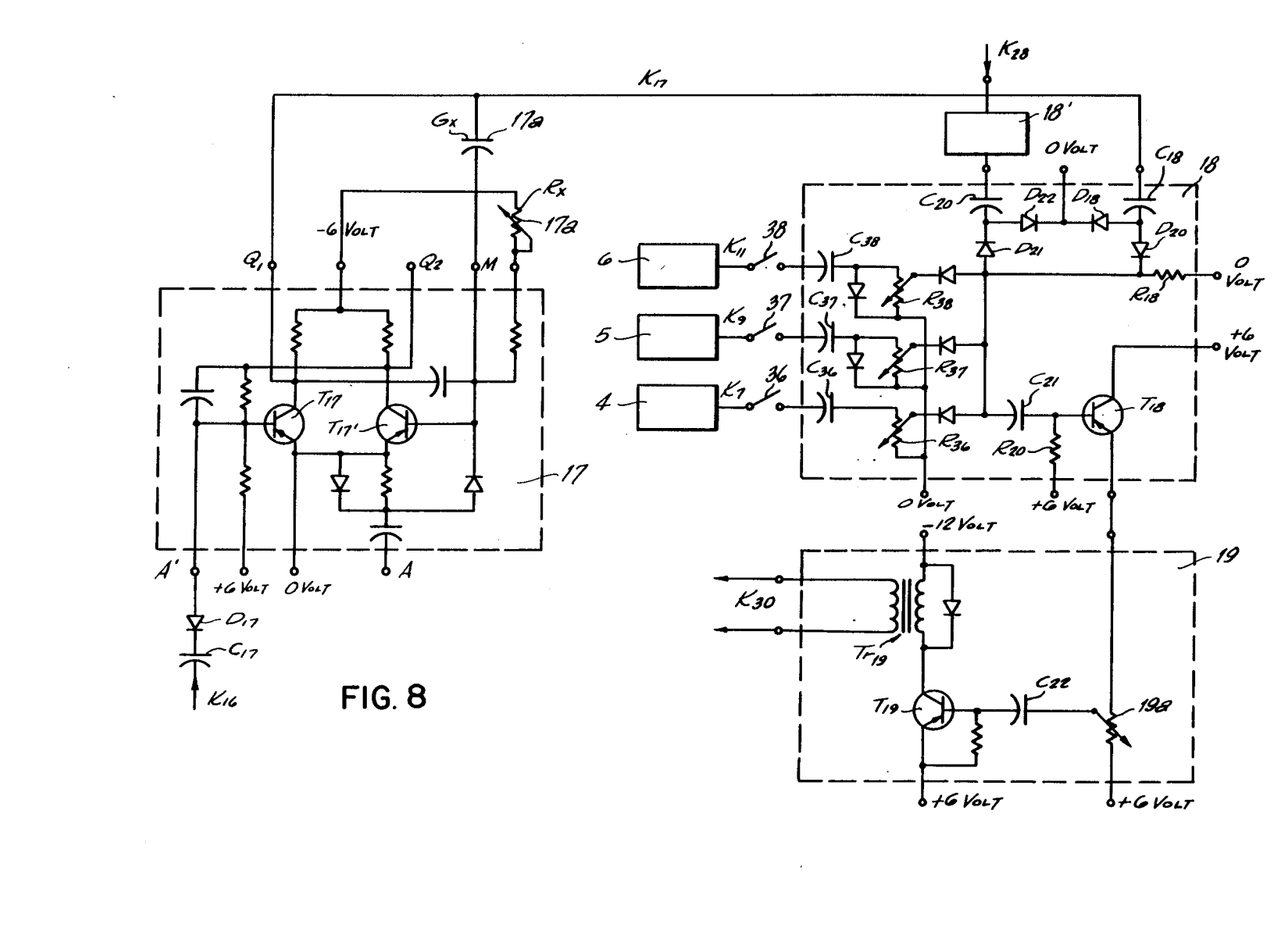
FIG. 8 is a circuit diagram of the components 18 and 19.
Figure 9:
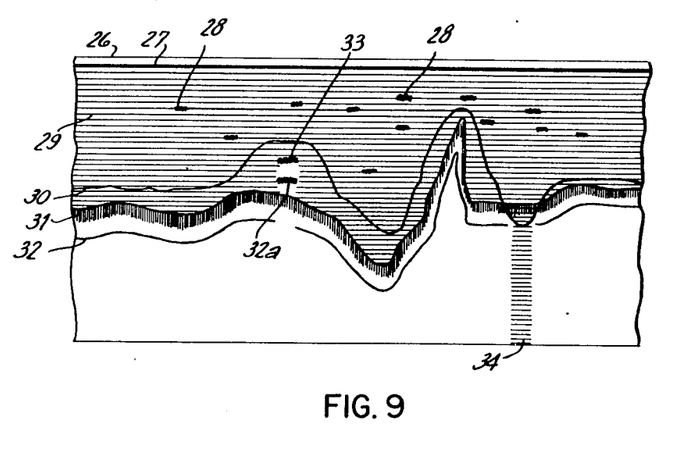
FIG. 9 is an echogram with the markings of measuring distances appearing according to the invention, which markings were picked up by the pulse counter developed from the counting decades.

FIG. 8 illustrates in detail the circuit of the recording monostable multivibrator 17, and its adjustment member 17a. This multivibrator 17 serves to draw a control line parallel to the echo recording. The control line accurately indicates when the counters 4 to 7 stop the counting process. In FIG. 9 this line is designated by 32.

In detail the circuit operates in the following manner: The monostable multivibrator 17 differs from the other monostable multivibrators used in the apparatus in that an output pulse no longer follows a positive input, but rather a negative input. The negative pulse is formed, during the switch-over of the monostable multivibrator 8, at its outlet $Q_2$, when the voltage jumps from 0 volts to $-6$ volts at the line $K_{16}$. This voltage jump, as previously described, stops the counter. Since the latter emits only a negative voltage pulse after the termination of the counting, the coupling with the monostable multivibrator 17 must occur in a different way. It no longer takes place through the input $A_1$, but through $A_1'$ to the base of the transistor $T_{17}$. The negative pulse arrives at this connection through the line $K_{16}$ a coupling condenser $C_{17}$ of 500 pf. and a diode $D_{17}$. Thus transistor $T_{17}$ becomes conductive and transistor $T_{17}'$ becomes blocked. The duration of blocking depends, as in other monostable multivibrators, from the time constants, which can be regulated stepwise by adding the additional condenser $C_x$ and continuously by the variable resistor $R_x$ (see FIG. 5). The one or several additional condensers $C_x$ and the variable resistor $R_x$ together form the adjusting member 17a. Resetting of the multivibrator 17 takes place at a time, for example, corresponding to the depth of the sounder. During resetting, that is during switching from the delayed condition to the rest condition, a negative pulse is formed at the outlet $Q_1$. This negative pulse is now transferred through the 1 μf. coupling condenser $C_{18}$ to the mixing stage 18 to the transsitor $T_{18}$, through the line $K_{17}$. So that the positive pulse flank cannot have adverse effects, there is provided a diode $D_{18}$ which serves to conduct away the positive voltage peak. The diode $D_{20}$ permits forming only a negative pulse. It receives a potential through the resistor $R_{18}$, such that even relatively weak signals can effect a change. The other signals now pass to the mixer stage 8. The output $Q_2$ of the component 15 emits a positive input pulse to a reversing stage 18' over the line $K_{28}$. The negative pulse produced at the output $Q_1$ arrives at the diodes $D_{22}$ and $D_{21}$ through a condenser $C_{20}$. The reversing stage 18' is constructed the same as the reversing stages 9b and 12b in FIG. 5. The reversing stage 18' can be eliminated, if a second line $K_{28}'$ is connected with the inverse output $Q_1$ of the monostable multivibrator 15 and with the condenser $C_{20}$. The negative voltage pulse arrives at one of the terminals of the resistor $R_{18}$ through capacitor $C_{20}$ in the same manner as the negative pulse through $C_{18}$. The other terminal of resistor $R_{18}$ lies at 0 volt. The negative pulse through capacitor $C_{20}$ then passes through the coupling condenser $C_{21}$ to the base of the transistor $T_{18}$ of the mixing stage 18. In rest position the transistor is blocked by the potential $+6$ volts appearing across the resistor $R_{20}$. The transistor $T_{18}$ is rendered conductive by the negative pulse appearing at its base. The variable resistor 19a passes the negative pulse through the coupling condenser $C_{22}$ of the impedance transformer 19 to the base of its transistor $T_{19}$. The output transformer $Tr_{19}$ applies the corresponding signal to the line $K_{30}$. One terminal of the resistor $R_{18}$ is connected, by means of a network comprising a condenser and a variable resistor and diodes, to the switches 36, 37 and 38 of the counting decades 4, 5 and 6. The circuits of the input capacitors $C_{18}$, $C_{20}$, $C_{36}$, $C_{37}$ and $C_{38}$ to the base of the transistor $T_{18}$ form an OR-gate, that is to say, the transistor $T_{18}$ becomes conductive, when at least one of the several inputs has a negative pulse applied thereto. The switches 36, 37 and 38 pass the negative counting pulses of the decades 4, 5 and 6 to the input capacitors $C_{36}$, $C_{37}$ and $C_{38}$ thereby blocking the transistor $T_{18}$ of the mixing stage. This transmits a corresponding recorder pulse through the line $K_{20}$ and to the recording instrument 25. By suitably adjusting and/or adding to the variable resistors $R_{36}$, $R_{37}$ and $R_{38}$, the insertion of all switches 36, 37 and 38 can make each hundredth line heavier than each tenth line and each tenth line heavier than the unit lines. By suitable adjustment of the control member 19a it is possible to so weaken the writing pulses for the "units" that only for each tenth, hundredth or thousandth counting pulse a distance marking is recorded. The same effect can be achieved, as explained above, by opening switch 36 or the switches 36 and 37.

The negative pulses of the multivibrators 15 and 17 at the inputs $C_{18}$ and $C_{20}$ of the mixing stage 18 achieve the following:

The switch-back of the multivibrator 15 after a certain blocking time and the switch-back of the multivibrator 17 after a time, which is connected with the termination of the counting process, produce the line 32 (FIG. 9). The line 30 indicates the end of the blocking of the receiving channel occasioned by switch-back of the multivibrator 15.

In FIG. 9, the record carrier, such as a paper tape, is denoted by 26. It will be understood that the advance of the recording tape is from the left to the right or vice versa at constant speed, and that the recordings are produced by the pulses being applied to a stylus member travelling transversely across the tape. For a given length of time, the transmitter pulses acting upon the stylus produce in totality a continuous black line at 27. Apparent at 28 are echoes of reflectors in the water, for example fish. The above-described group of electronically produced reference lines is denoted by 29. An identifying marker curve 30 indicates the end of the blocking interval of the receiving channel. The bottom-echo recording appears at 31 and the delayed bottom-profile recording at 32. At the location 33 the pulse counter was prematurely stopped by a strong fish echo which terminated the blocking of the receiving channel at a too early moment. In this case, the group of lines 29 terminate at the echo recordings of the reflectors that had stopped the pulse counter, and the delayed bottom-profile recording 32 has become interrupted and displaced to 32a. At the location 34 the blocking of the receiving channel was unduly terminated after the arrival of the bottom-echo pulse and hence the pulse counter was not stopped at the proper time. In this case the reference lines 29 continue running beneath the bottom-echo recording 31, and the delayed bottom-profile recording 32 is interrupted.

The example shows that an echogram obtained with an echo-sounding system according to the invention can readily be read and clearly indicates whether the pulse counter has actually measured the desired range or whether the result indicated by the digital indicator of the pulse counter was falsified by echoes received prior to arrival of the bottom echo or by electrical disturbances.

If, according to another feature of the invention, each measuring result of the pulse counter is automatically recorded together with the clock time supplied from a conventional digital time printer, then the measuring results can be evaluated at any subsequent time with particularly great accuracy on the basis of the echogram, the digital measuring values, and the plotted course of the ship.

Another advantage of the apparatus according to the invention resides in the fact that it affords measuring the distance of two reflectors by means of the pulse counter. The echogram then permits reading between which reflectors the pulse counter has performed the measurement, because the reference lines are recorded only between these particular reflectors. For this purpose, the switch 35 must be placed in position $b$ so that the receiving channel 23, 24 is additionally connected with the gate 9 of the releasing channel through the pulse transformer 11, while this pulse transformer 11 is separated from the sounding pulse generator 21.

By virtue of these means, the pulse counter is started by the first echo pulse which, after the blocking of the starting channel is terminated, for example by an additional adjustable monostable multivibrator (not shown in FIG. 1), exceeds a magnitude adjustable by control member 11$a$ of the pulse transformer 11. The pulse counter is then stopped by the next following echo pulse that exceeds a value adjustable by control member 13$a$ of pulse transformer 13, after termination of the blocking of the receiving channel by the monostable multivibrators 15 and 16.

Instead of marking the range measured by the pulse counter with the aid of electronically produced lines that appear in the echogram, each switching of the bistable multivibrator 10 may be caused to pass a pulse, produced by such switching, to the stylus or indicating member of the recording instrument directly, or through a pulse generator furnishing a positive or negative pulse of given curve shape. In this manner the releasing pulses and stop pulses are identified on the echogram.

According to another modification of the system according to the invention, the frequency of the generator 1 is variable so that it can be adjusted by hand or automatically in accordance with a particular sonic velocity depending upon the temperature, salt content and density of the sea water. As a result, the digital indication of the measuring results furnished by the pulse counter, as well as the electronically produced lines of the echogram, are no longer disturbed by variations in sound velocity.

The recording of electronically produced lines during the measuring period of the pulse counter affords connecting one or more synchronized subsidiary recording instruments or cathode ray tubes to the parent or master recorder, each subsidiary instrument serving to record or exhibit a continuously or incrementally displaceable, magnified partial range, or the entire sounding range, together with the additional reference markings of the master recorder. It is preferable that such indications of partial ranges permit a direct reading not only of relative but also of absolute measuring values. For that purpose, it is of advantage to impart to certain reference lines, for example each tenth line, a different identification with increasing depth. This affords determining from the echograms of the subsidiary devices with magnified partial-range indication, the position of the exhibited partial range relative to the total sounding range of the master equipment. This is important for subsequent evaluation of such echograms.

Figure 10:
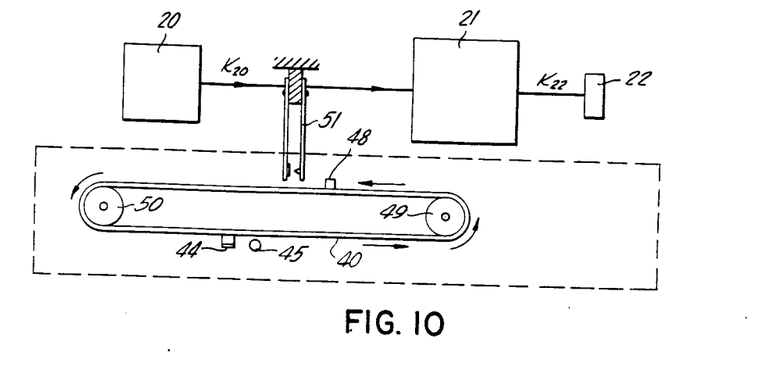
FIGS. 10 and 11 are plan and elevation views respectively of the recording instrument and the components cooperating therewith.
Figure 11:
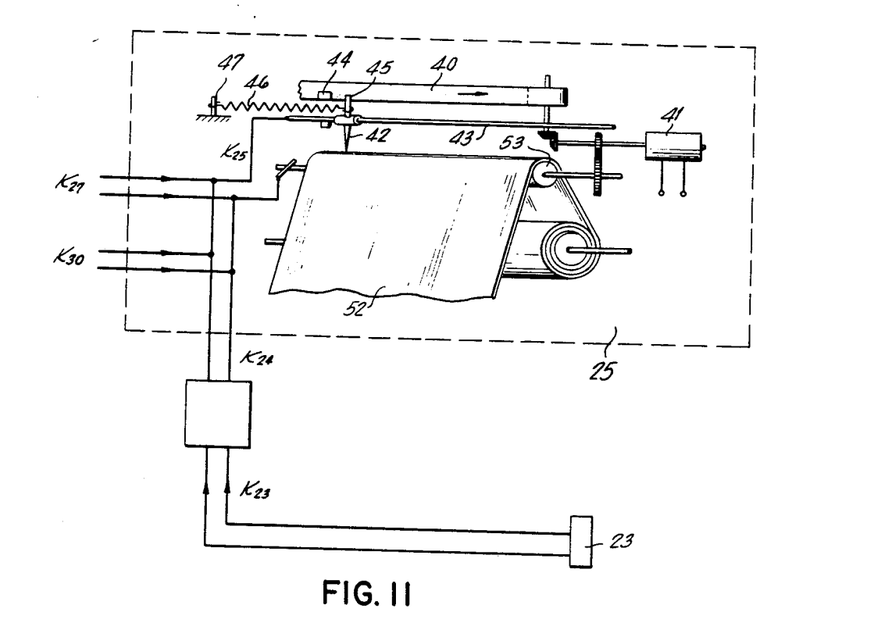

For the better understanding of the recording process of the previously described circuit arrangement, FIGS. 10 and 11 illustrate partially plan and elevation views of a recording instrument 25 in cooperation with components 20, 21 and 24. The recording instrument is a flyback writer whose manner of operation may briefly be described, as follows:

An endless belt 40 which is mounted on two carrier rollers 49 and 50 and has two switching cams 44 and 48, is driven by means of gears by an electric motor 41 at a uniform speed and in the direction shown in the drawing. When the belt 40 rotates, the switching cam 44 contacts a pin of a carriage 45, which rides on a guiding bar 43 and is biased to one end of the bar by a spring 46. Shortly thereafter, the switch cam 48 touches the spring contact 51, closes it, thereby closing the line $K_{20}$. The sound pulse generator 21 passes a short pulse over the water sound transducer 22. During the further movement of the switch cam 48 by the belt 40 the spring contact 51 is again opened. The sound pulse of the water sound transducer or sending transducer 22 acts through the receiving transducer 23 which amplifies the received pulse through receiving amplifier 24. The writing point 42 on the carriage 45 records a so-called zero sound on the current-sensitive paper 52 with the aid of a jumping spark. The carriage 45 now is moved further along the guiding bar by the switching cam 44 until the switching cam 44 frees itself from the pin of the carriage 45, and the carriage 45, by action of the spring 46, which is fixedly attached to the housing at 47, returns to its original position. In the path of the carriage 45 transported by the cam 44, the signals, which come from the lines 24, 27 and 30, are recorded on the record carrier, that is, on the current-sensitive paper 52. The current-sensitive paper 52 is gradually slowly moved forward by the electric motor 41 through a cylinder 53 and a gear. Depending on the depth of the sea bottom it is possible to change the velocity of the belt through a switching-over gear. The gradual step-by-step speed of the paper 52 thus remains constant.

The individual components of which the apparatus according to the invention is composed, for example the gate circuits, counting decades and multivibrators, are known as such and are generally obtainable in the trade as individually complete subassemblies. Applicable recording instruments are likewise known and commercially available, for example from the assignee of the present invention. Such devices are described for example in U.S. Patents No. 2,788,509 and No. 3,013,246, both of H. Bolzmann, and both assigned to the assignee of the present invention, and in Patent No. 3,076,063 of F. Richter, assigned to the same assignee.

While embodiments of the invention have been shown in detail it will be obvious to those skilled in the art that the invention may be practised otherwise within the scope of the following claims.

I claim:

1. A pulse-type echo-sounding system, comprising pulse transducer means for transmitting and receiving sonic signals, a digital-indication pulse counter, a recording instrument having a recording surface for producing an echogram thereon and connected to said transducer means, electronic gate means connecting said counter with said transducer means for causing the counter to respond in accordance with the time interval between transmitted and echo pulses, and circuit means connected between said counter and said instrument for controlling said instrument to add to the echogram a number of indications showing the sequence and magnitude of the distances measured by said counter.

2. An echo-sounding system according to claim 1, comprising a pulse generator connected with said recording instrument and furnishing identifying marking pulses at the beginning and end respectively of the measuring operation of said counter.

3. An echo-sounding system according to claim 1, comprising stop means connected with said pulse counter and having an adjustable blocking member for blocking said stop means an adjustable interval of time relative to echo pulses.

4. In echo-sounding apparatus according to claim 3, said adjustable blocking member comprising a monostable multivibrator connected with said recording instrument to cause marking of a pulse when said stop means are being released.

5. An echo-sounding system according to claim 1, comprising a fixed-frequency pulse generator connected with said counter for generating the electric counting pulses.

6. An echo-sounding system according to claim 1, comprising a pulse generator connected with said counter for generating the electric counting pulses, and means for adjusting the frequency of said generator in accordance with the sonic speed in the water.

7. Echo-sounding apparatus according to claim 4, comprising a monostable electronic control member adapted to switch to instable condition in response to pulses of predetermined minimum intensity and having an instantaneous output pulse of given high intensity when returning to stable condition, said monostable member being connected to said recording instrument to cause production of an identifying mark thereby.

8. An echo-sounding system according to claim 1, comprising a receiving amplifier having an input stage connected to said transducer means and an output stage connected to said recording instrument, a monostable electronic control member adapted to switch to instable condition in response to releasing pulses of predetermined minimum intensity and having an instantaneous output pulse of given high intensity when returning to stable condition, said monostable member being connected to said receiving amplifier just ahead of said output stage for causing said recording instrument to record an identifying mark in response to said latter pulses.

9. In an echo-sounding system according to claim 8, said monostable member having said output pulse spaced from the releasing pulse an amount corresponding to the mounting depth of said transducer means below the water surface.

10. A pulse-type echo-sounding system, comprising pulse transducer means for transmitting and receiving sonic signals, a digital-indication pulse counter having several digital counting stages, a recording instrument having a recording surface for producing an echogram thereon and connected to said transducer means, electronic gate means connecting said counter with said transducer means for causing the counter to respond in accordance with the time interval between transmitted and echo pulses, and pulse-responsive control means tap-connected to the exit of at least one of said counting stages to derive pulses therefrom and connected to said instrument for additionally controlling said instrument and adding to the echogram a number of indications showing the sequence and magnitudes of the distances measured by said counter.

References Cited by the Examiner

UNITED STATES PATENTS 2,949,973  8/60  Broding et al. _________ 181—0.5
2,955,284  10/60  Thorsen _____________ 343—11

CHESTER L. JUSTUS, *Primary Examiner.*